United States Patent [19]
Chuang et al.

[11] Patent Number: 5,374,999
[45] Date of Patent: Dec. 20, 1994

[54] SCAN CONTROL SYSTEM

[75] Inventors: Ko-Chien Chuang, Chung Ho; Fu-Chun Wu, Hualien, both of Taiwan, Prov. of China

[73] Assignee: Silitek Corporation, Taipei, Taiwan, Prov. of China

[21] Appl. No.: 995,279

[22] Filed: Dec. 22, 1992

[51] Int. Cl.⁵ .............................................. H04N 1/04
[52] U.S. Cl. .................................. 358/496; 358/498; 382/7; 235/476
[58] Field of Search ............... 235/441, 488, 449, 475, 235/476, 481; 358/471, 473, 474, 496, 497, 498; 382/7, 59; H04N 1/04

[56] References Cited

U.S. PATENT DOCUMENTS

| | | | |
|---|---|---|---|
| 4,432,023 | 2/1984 | Mehalek | 358/496 |
| 4,523,330 | 6/1985 | Cain | 382/7 |
| 4,776,021 | 10/1988 | Ho | 382/7 |
| 5,014,324 | 5/1991 | Mazumder | 382/7 |
| 5,019,918 | 5/1991 | Kubota et al. | 358/473 |
| 5,103,322 | 4/1992 | Beck et al. | 358/496 |
| 5,115,325 | 5/1992 | Kallin et al. | 358/406 |

Primary Examiner—Edward L. Coles, Sr.
Assistant Examiner—Kim Yen Vu
Attorney, Agent, or Firm—Lowe, Price, LeBlanc & Becker

[57] ABSTRACT

Disclosed is a scan control system for controlling the scanning operation of a business card reader. The scan control system is consisted of a document sensor detector, a delay time circuit, a motor start drive, a motor drive counter, a start scan monitor, an error detector circuit, an end of scan circuit, an encoder control circuit and a divide frequency circuit, and connected to a computer for document filing, in particular business card filing.

10 Claims, 13 Drawing Sheets

SCAN CONTROL SYSTEM

BACKGROUND OF THE INVENTION

The present invention relates to a scan control system for document filing. Through the instruction of a computer software, the business card or like document which was inserted into the system is scanned by the scanner of the system and the data of the business card or like document is then shown through the monitor of a computer and then stored in the memory of the computer by means of the control of a saving instruction. The data of either document stored in the computer can be fetched from the computer by inputting either item of the data of the document to be fetched. For example, the data of a document can be fetched and displayed through the monitor of the computer by inputting the name of person or company, telephone number, address, or facsimile number of the document to the computer.

Power supply is obtained for the scan control system from the computer. The system comprises a delay time circuit which is triggered to give a short length of time delay for the user to put the document in position. The system uses a document sensor detector, a motor start drive, a motor drive counter, a start scan monitor, an error detector circuit, an end of scan circuit, an encoder control circuit and a divide frequency circuit to control the operation of the motor and On-Off of the encoder signal. Once the document was carried to the scan line, the encoder signal was turned on to start scanning. On the contrary, the encoder signal was turned off to end the scan as the document was moved away from the scan line. The data of the document thus obtained from scanning, is then transmitted to the computer through a signal data line, and therefore the data can be shown through the monitor of the computer or stored in the memory of the computer.

DETAILED DESCRIPTION OF THE PREFERRED EMBODIMENT

Referring to the annexed drawings in detail, a scan control system according to the present invention is generally comprised of a document sensor detector, a delay time circuit, a motor start drive, a motor drive counter, a start scan monitor, an error detector circuit, an end of scan circuit, an encoder control circuit, and a divide frequency circuit.

Figure 12:
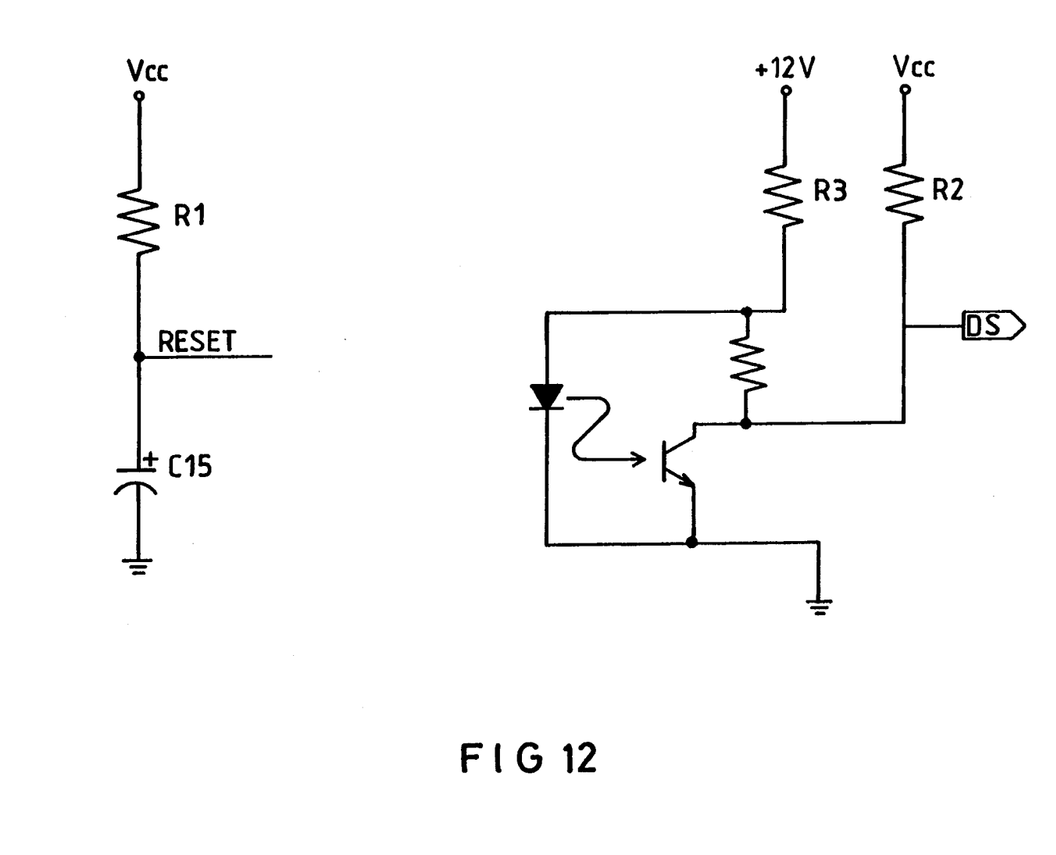
FIG. 12 is a circuit diagram of the reset and document sensor circuit.

The document sensor detector (see FIG. 3) is consisted of a D type flip-flop IC1, an inverter NOT1, and the DS signal from a photo-coupling device (see FIG. 12). The document sensor detector is triggered by a triggering signal TG to obtain a complete waveform from a document being inserted before power-on or after power-off, for initiating the posterior circuit. The document sensor detector also has the function of reset.

Figure 4:
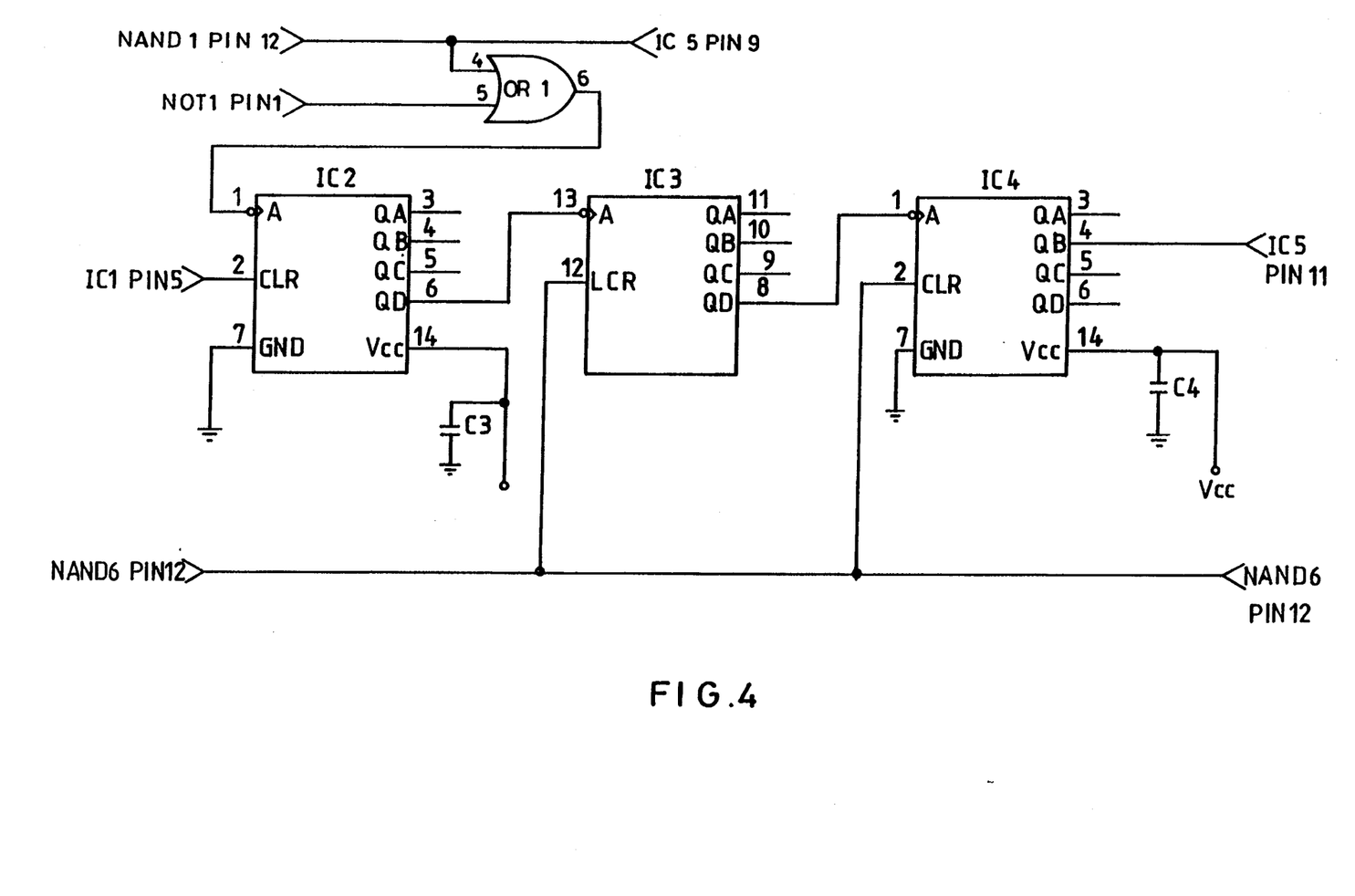
FIG. 4 is a circuit diagram of the delay time circuit.

The delay time circuit (see FIG. 4) consisted of three binary counters IC2, IC3, IC4 and an OR gate OR1. It provides 1.43 seconds time delay for the user to put document in position. As the TG signal is 2.8 ms and the counters IC2,IC3,IC4 are multiplied by 512, the delay time is $2.8 ms \times 512 = 1.43$ seconds. A rising edge pulse is sent to a D type flip-flop IC5 in turning the output of Q to high potential when counting up to 512. By means of the operation of OR gate OR1 with TG, counters IC2,IC3,IC4,IC5 are stopped from generating clock signals, and therefore they count once only.

Figure 1:
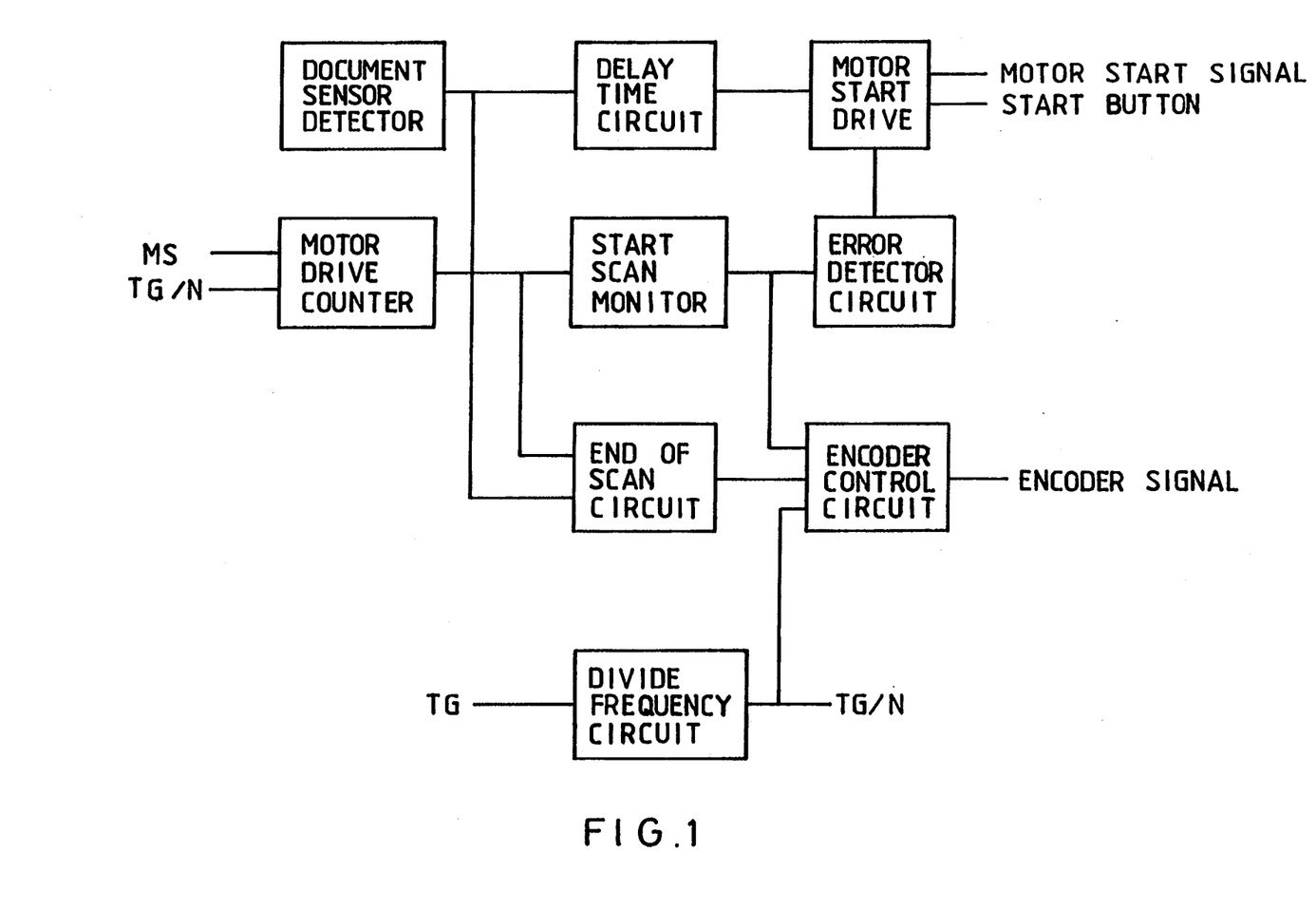
FIG. 1 is a system block diagram of a scan control system according to the present invention.
Figure 5:
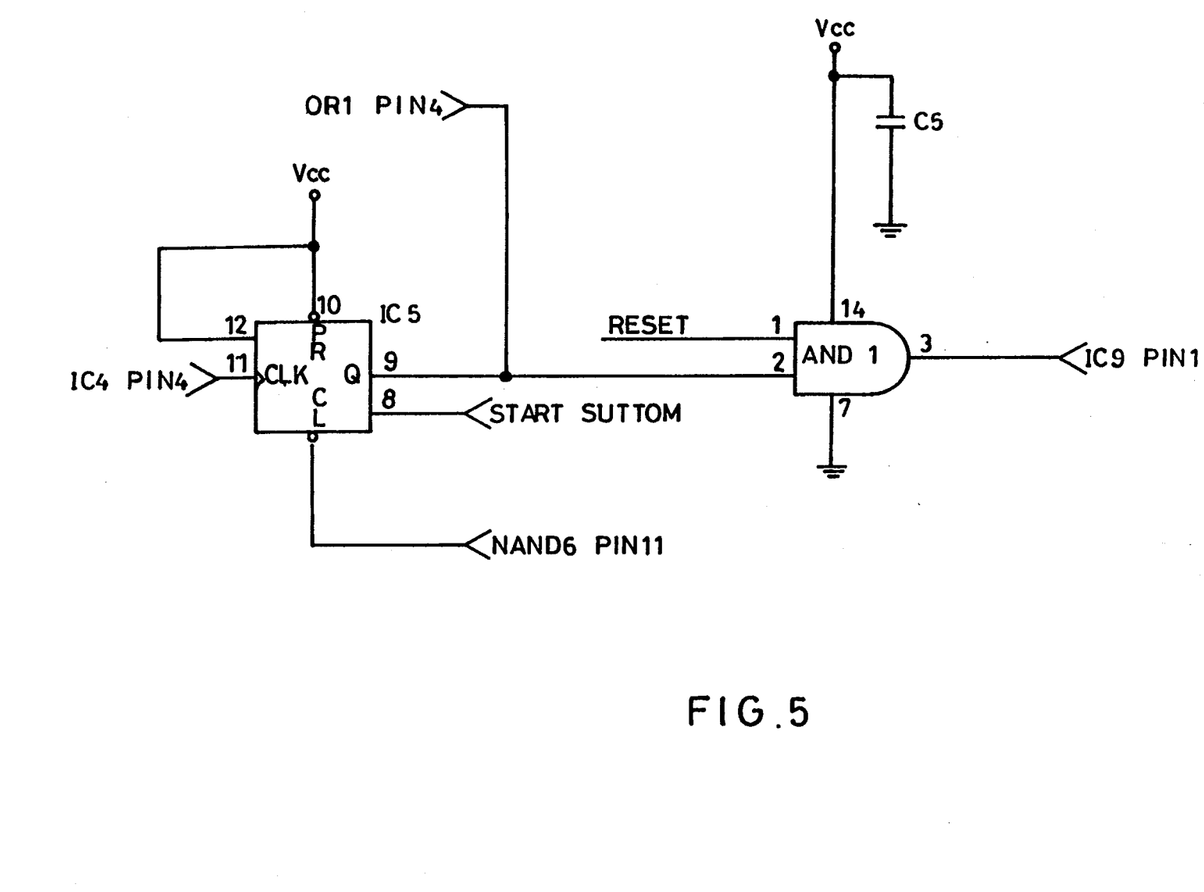
FIG. 5 is a circuit diagram of the motor start drive.

The motor start drive (see FIG. 5) is consisted of the aforesaid D type flip-flop IC5 and an AND gate AND1, and controlled to provide a start button and a motor start signal (see the upper right corner on FIG. 1). After each operation of the delay time circuit, a rising edge pulse is sent to the D type flip-flop IC5, thereby causing it to provide a start button and a motor start signal. The revolving speed of the motor is controlled through TG/N.

Figure 2:
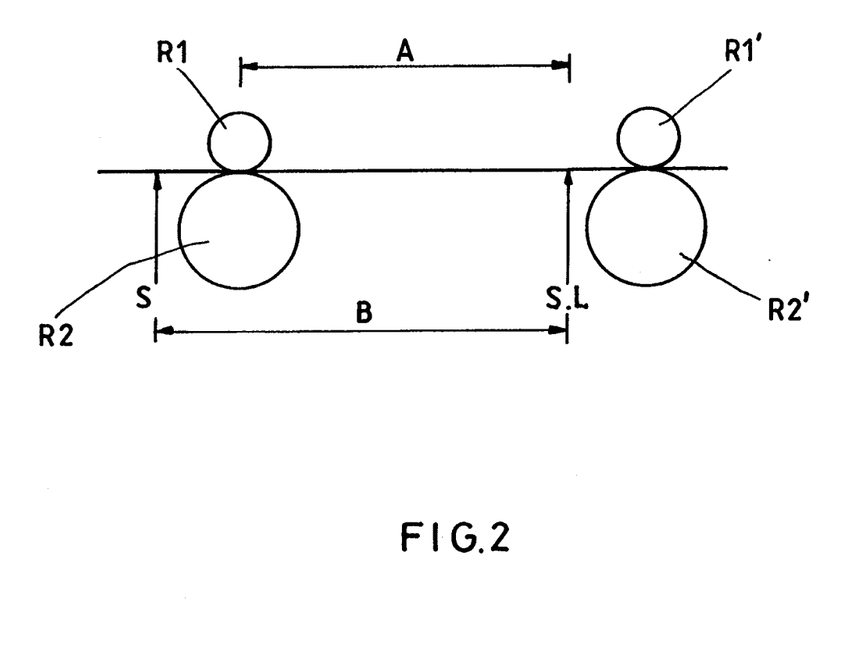
FIG. 2 illustrates the steps from the sensor to the scan line and the steps from the rollers to the scan line.

The TG/N signal of the motor drive counter (see FIG. 2) is divided by 50. Because the motor has to move 450 steps B from the sensor S to the scan line S.L and 350 steps A from the rollers R1,R2 to the scan line S.L, the greatest common divisor between A and B is 50, and therefore 50 is adopted for the counter to simplify the circuit. The motor drive counter is consisted of IC6, IC7, OR gates OR2,OR3, AND gate AND2, and NOT-AND gates NAND1,NAND2,NAND3. As the motor drive counter counts up to 50, a pulse is sent to the posterior circuit, and then the motor drive counter is cleared automatically.

Figure 7:
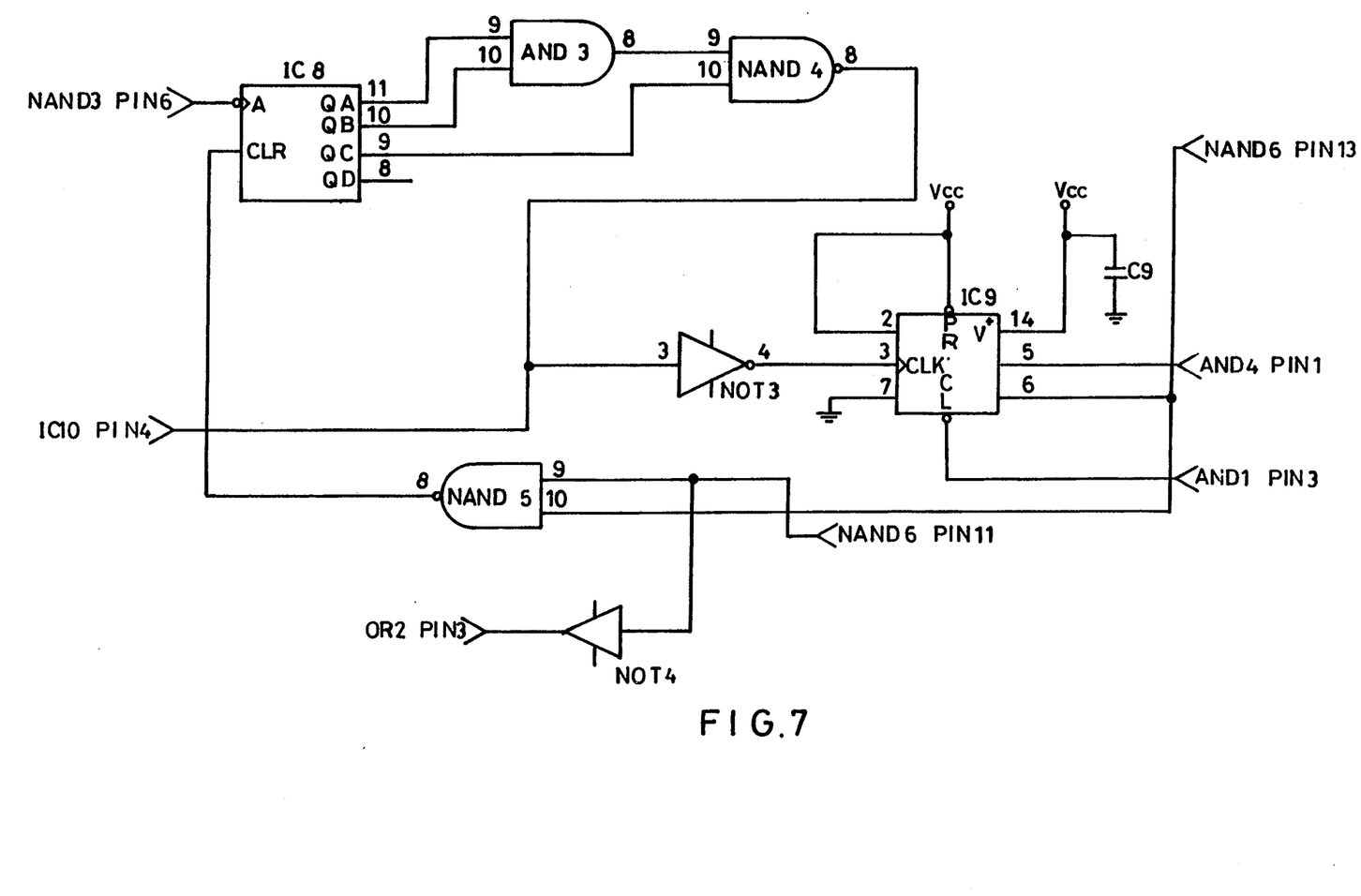
FIG. 7 is a circuit diagram of the start scan monitor.

The start scan monitor (see FIG. 7) is a count 7 circuit matching the motor drive counter to achieve count 350. As the start scan monitor counts up to 7, a decoder signal is triggered to start scanning, and then the start scan monitor is cleared automatically.

Figure 8:
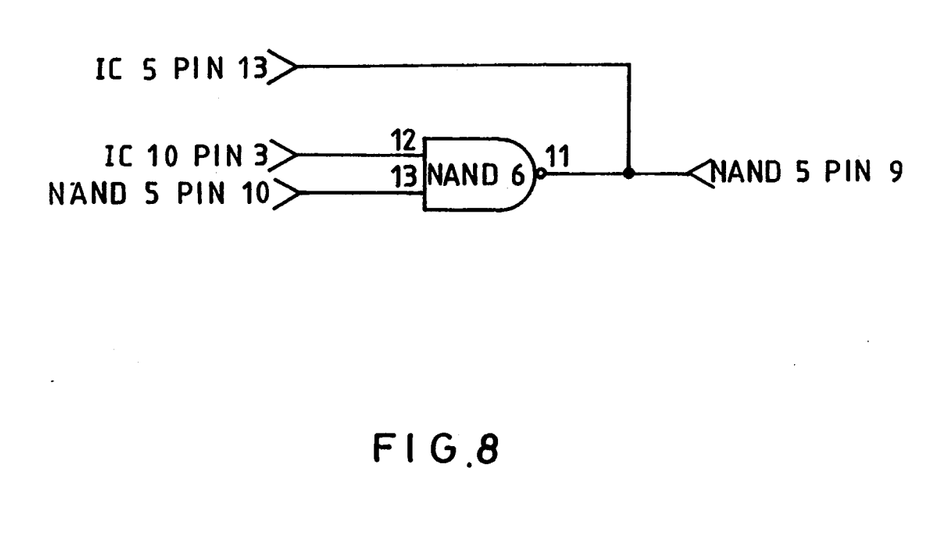
FIG. 8 is a circuit diagram of the error detector circuit.

The error detector circuit (see FIG. 8) is to detect the positive insertion of a business card into the business card reader. The error detector circuit compares the signal from the document sensor and the signal from the start scan monitor before the motor drive counter counts up to 350, so as to determine if there is an error feeding of document. The operation is normal when document sensor is ON (DS signal ON); the operation is abnormal when document sensor is OFF (DS signal OFF), and the motor is reset and stopped from sending a start button signal (external image signal).

Figure 9:
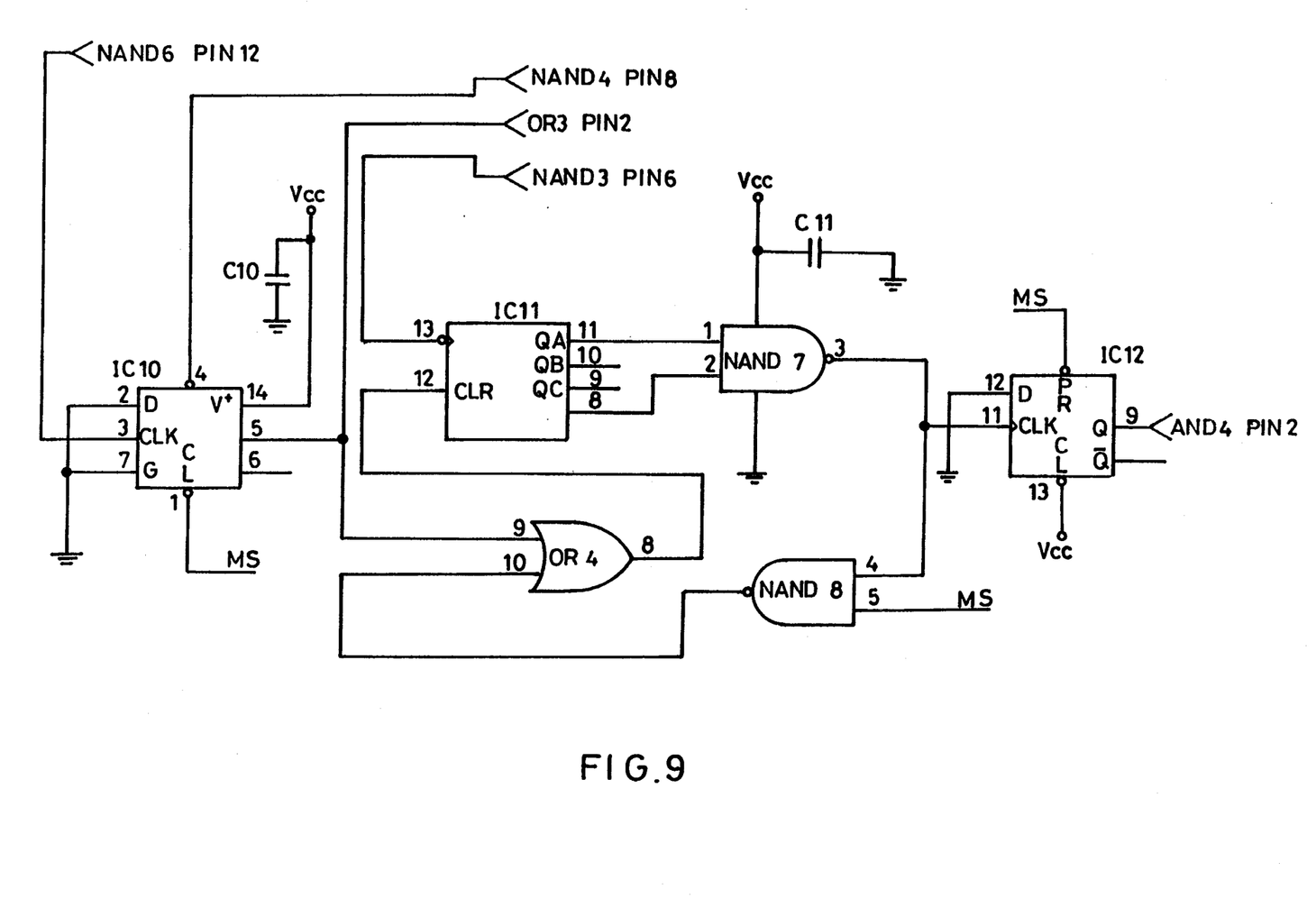
FIG. 9 is a circuit diagram of the end of scan circuit.

The end of scan monitor is shown in FIG. 9. When document passes through the document release sensor, the motor drive counter tuns off the encoder signal to end the scanning. The end of scan monitor is a count 9 circuit. Because there is 450 steps to be scanned after document was released from the sensor, the encoder signal is stopped to terminate scanning when the end of scan monitor counts up to 450, and the motor keeps operating in sending out document.

Figure 10:
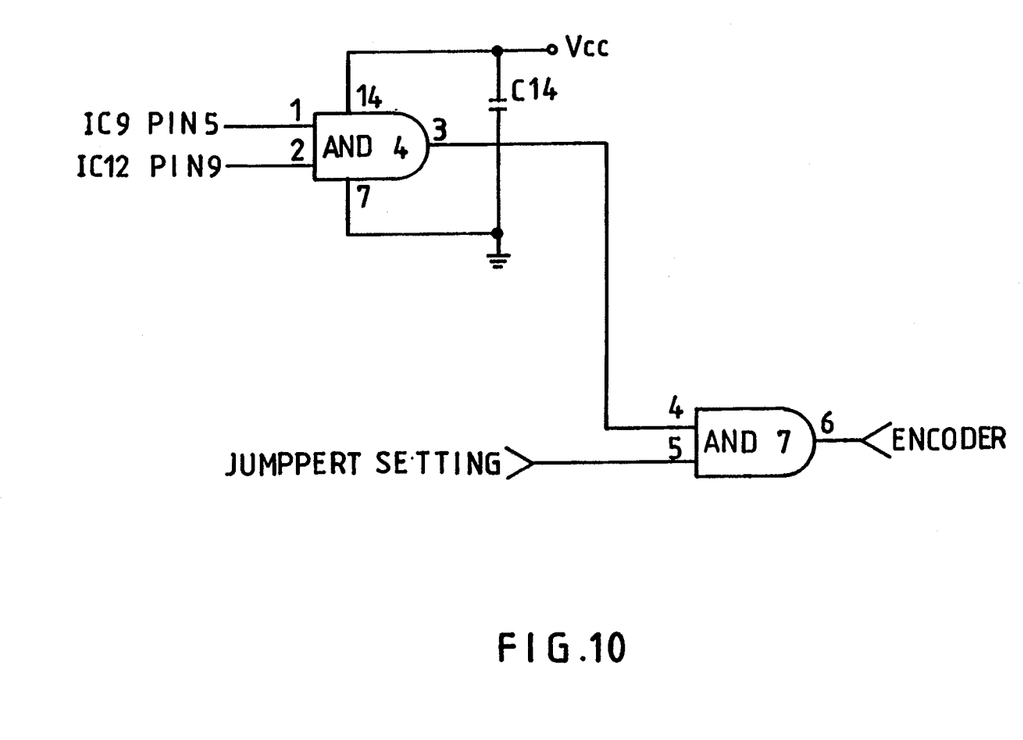
FIG. 10 is a circuit diagram of the encoder control circuit.

The encoder control circuit (see FIG. 10) is to control the encoder signal. Once the scan signal was received, the encoder control circuit lets the TG/N signal pass; once the end of scan signal was received, the encoder control circuit turns off the TG/N signal to stop scanning.

Figure 11:
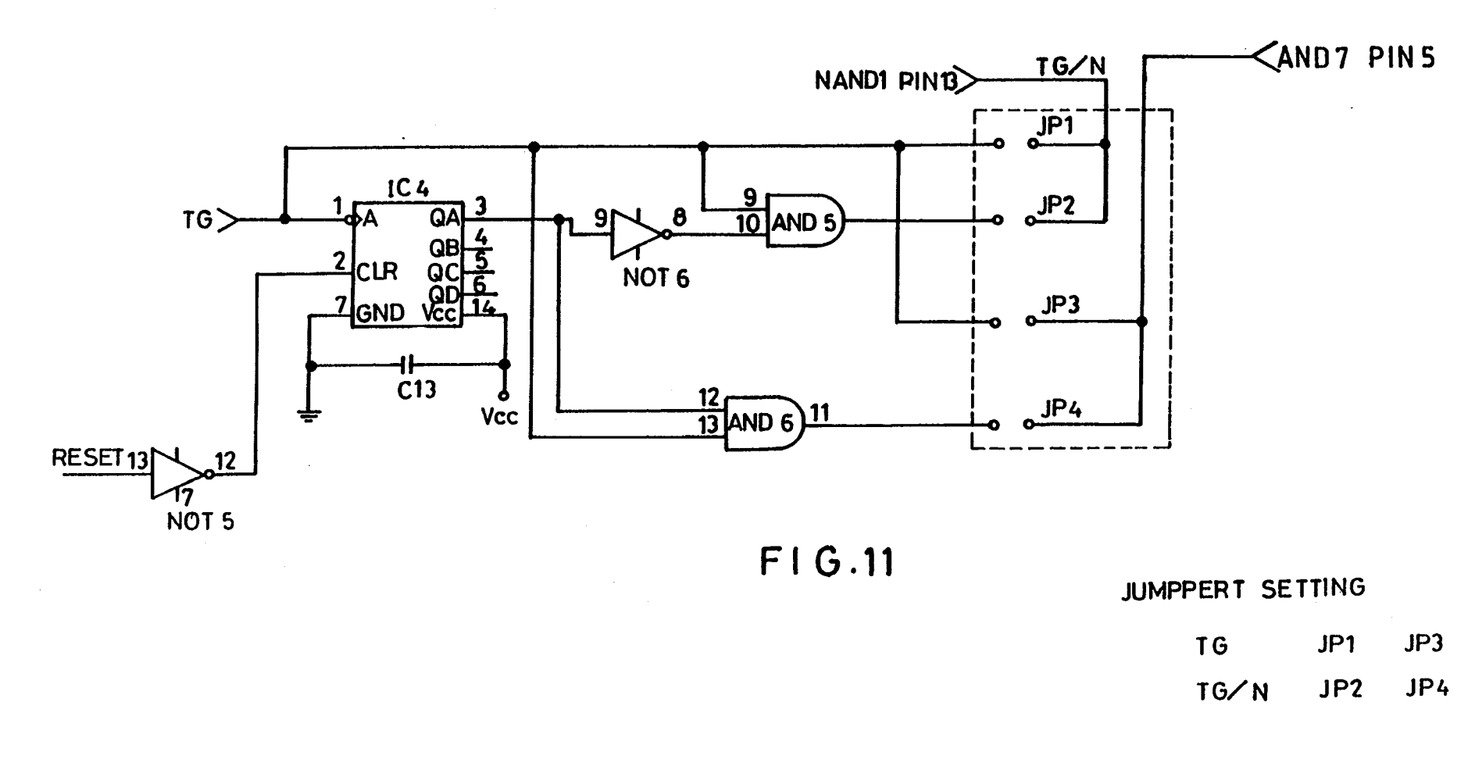
FIG. 11 is a circuit diagram of the divide frequency circuit.

The divide frequency circuit (see FIG. 11) is controlled by TG or TG/N to select the jumppert setting for controlling the motor drive. JP1,JP3 may be selected without dividing the frequency. JP2,JP4 may be alternatively selected to divide the frequency by 2.

Figure 3:
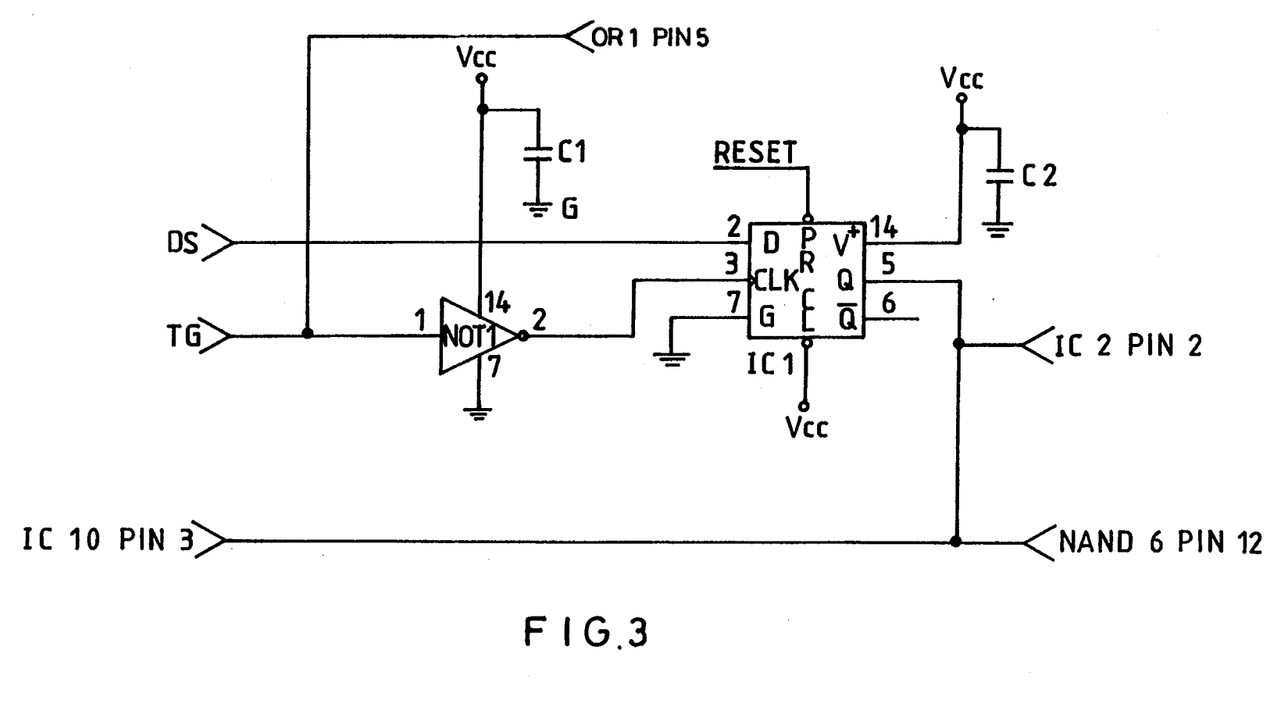
FIG. 3 is a circuit diagram of the document sensor detector.
Figure 6A:
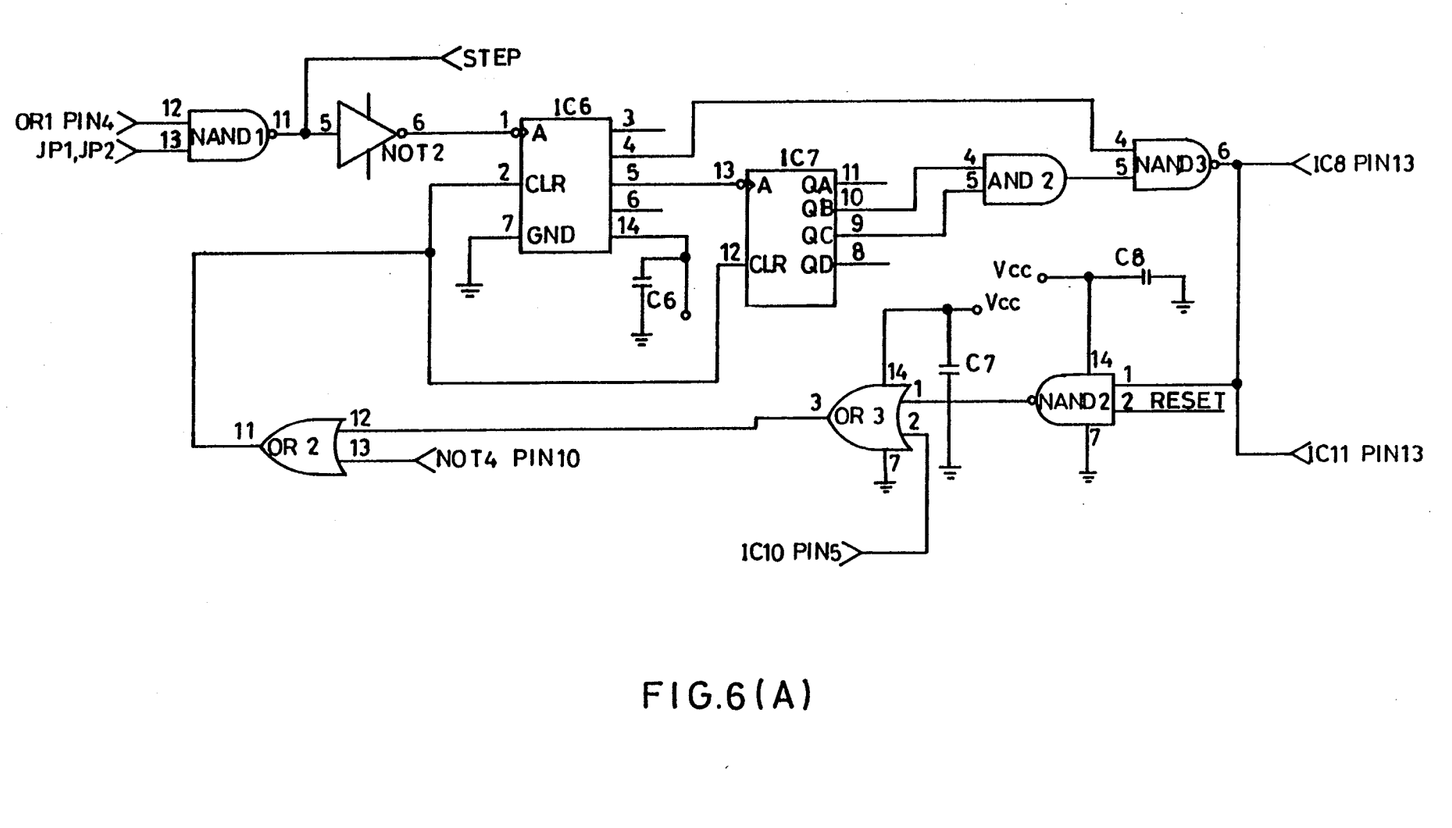
FIG. 6A is a circuit diagram of the motor drive counter part A.
Figure 6B:
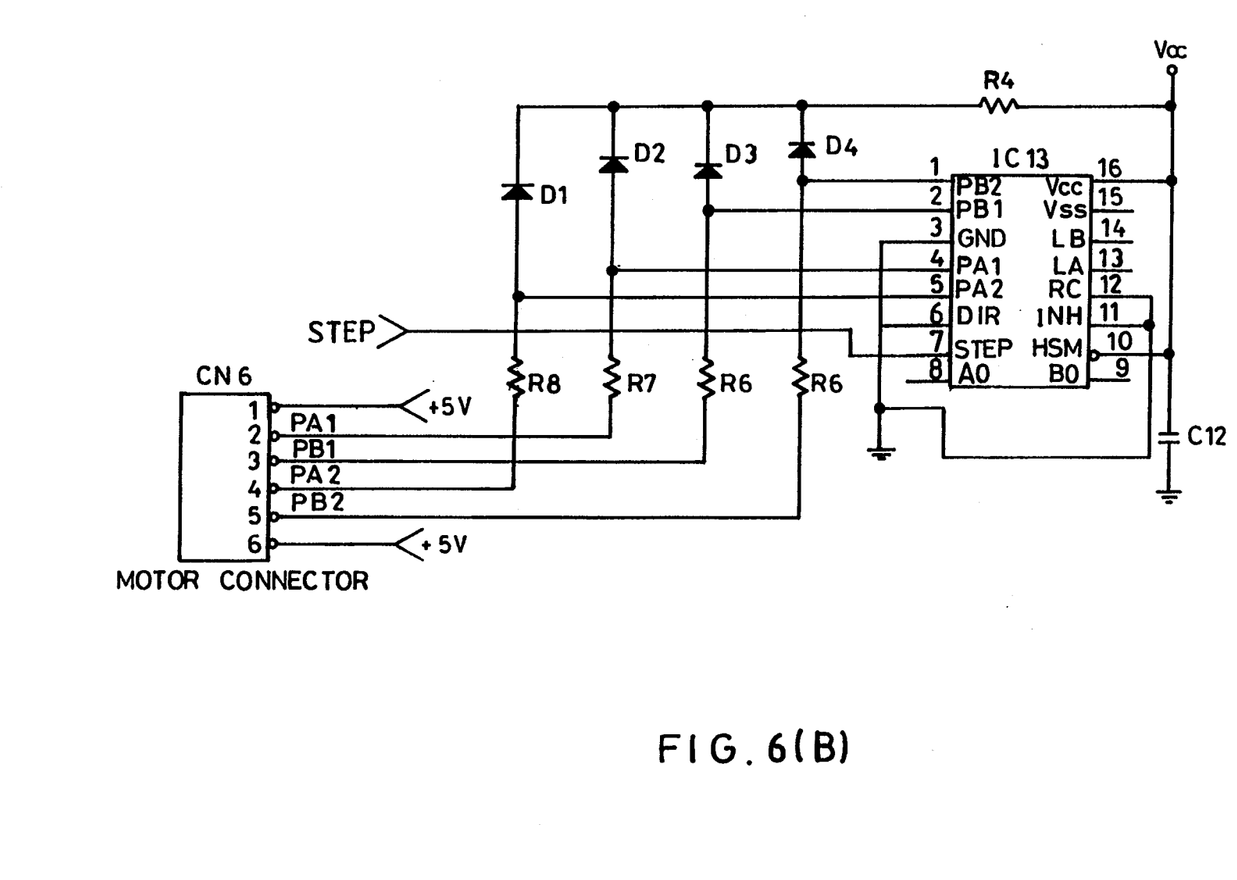
FIG. 6B is a circuit diagram of the motor drive counter part B.

When power supply connected (see the left side circuit of FIG. 12), the system is reset, and a DS signal is sent through the circuit shown on the right side of FIG. 12 to the pin-2 of IC1 (See FIG. 3). At the same time, a TG signal is sent from the pin-1 of the flip-flop NOT1 to the pin-3 of IC1, then from the pin-5 of IC1 to the pin-2 of IC4 (see FIG. 4), then from the pin-4 of IC4 to the pin-11 of IC5 (see FIG. 5), and then from the pin-9 of IC5 to the NOT-AND gate NAND (see FIG. 6); TG/N sends an optional control signal (JP1, JP2, JP3, JP4) (see FIG. 11) to the pin-12 of the NOT-AND gate NAND1 (see FIG. 6) to control the operation of the motor drive counter, thereby causing the NOT-AND gate NAND3 of the motor drive counter to send two signals for controlling the start scan monitor (the count 7 circuit of FIG. 7) to count up the steps from the introduction of document to the scan line and the end of scan circuit (the count 9 circuit of FIG. 9) to count up the steps from the end of scan to the document release sensor. Then, a signal is sent from the pin-6 of the AND gate AND 7 (see FIG. 11) to the encoder control circuit (See FIG. 10) to achieve the steps, and therefore document image was scanned and transmitted to the computer and displayed through the monitor thereof or stored in the memory thereof. The desired data can then be obtained from the computer by inputting the tittle of the desired document.

What is claimed is:

1. A scan control system comprising a document sensor detector, a delay time circuit, a motor start drive, a motor drive counter, a start scan monitor, an error detector circuit, an end of scan circuit, an encoder control circuit, and a divide frequency circuit, wherein the internal circuit of the document sensor detector is reset upon power-on and triggered to turn on a motor in rotating a first set of rollers R1,R2 through a first set of steps A after the insertion of a document, for permitting the document to be moved to a scan line, then to drive an encoder in Sending out an encoder signal for start of scan, then to stop the encoder from sending out the encoder signal after the motor has moved through a second set of steps B after the document was released from the document sensor detector, and then to continuously turn on the motor in sending the document out of the system through a second set of rollers R1',R2', and further wherein said delay time circuit provides a delay between detecting the document by said document sensing detector and turning on said motor for enabling a user to put the document in a proper position.

2. The scan control system of claim 1 wherein said document sensor detector is consisted of a D type flip-flop, an inverter, and a photo coupling device; said document sensor detector being controlled by a triggering signal to obtain a complete waveform from a document being inserted before power-on or after power-off, for initiating the posterior circuit.

3. The scan control system according to claim 1 wherein said delay time circuit is consisted of three binary counters IC2,IC3, IC4 and an OR gate OR1, and triggered by a 2.8 ms triggering signal to give 1.43 seconds time delay for document positioning; the counters IC2,IC3,IC4 being multiplied by 512 to provide 1.43 seconds delay time; a rising edge pulse being sent by said delay time circuit to a D type flip-flop IC5 in turning the output of Q to high potential when counting up to 512, thereby causing the counters IC2,IC3,IC4 to stop from generating clock signals and end the operation of counting.

4. The scan control system according to claim 1 wherein said motor start drive is consisted of a D type flip-flop IC5 and an AND gate AND1, and controlled to provide a start button and a motor start signal, the D type flip-flop IC5 being triggered to provide a start button and a motor start signal upon receipt of a rising edge pulse from said delay time circuit; the revolving speed of the motor is controlled by the TG/N.

5. The scan control system according to claim 1 wherein the TG/N signal of the motor drive counter is divided by 50 because the motor has to move 450 steps B from the sensor S to the scan line S.L (see FIG. 2) and 350 steps A from the first rollers R1,R2 to the scan line S.L and the greatest common divisor between A and B is 50; said motor drive counter is consisted of IC6, IC7, OR gates OR2,OR3, AND gate AND2, and NOT-AND gates NAND1,NAND2,NAND3; said motor drive counter gives a pulse to the posterior circuit when counts up to 50 and is then cleared automatically.

6. The scan control system according to claim 1 wherein said start scan monitor is a count 7 circuit matching said motor drive counter to achieve count 350; the start scan monitor counts up to 7, a decoder signal is triggered to start scanning as the start scan monitor counts up to 7 and then start scan monitor is cleared automatically.

7. The scan control system according to claim 1 wherein said error detector circuit is to detect the positive insertion of a document into a business card reader, and to stop the motor from operating when the document is not correctly inserted into the business card reader.

8. The scan control system according to claim 1 wherein said end of scan monitor matches said motor drive counter to turn off the encoder signal in ending the scanning when the document passes through the document release sensor; said end of scan monitor is a count 9 circuit; because there is 450 steps to be scanned after document was released from the sensor, the encoder signal is stopped to end scanning when said end of scan monitor counts up to 450, and the motor keeps operating in sending out the document.

9. The scan control system according to claim 1 wherein said encoder control circuit is to control the encoder signal, and to let the TG/N signal pass as the scan signal was received or turn off the TG/N signal in stopping the scanning as the end of scan signal was received.

10. The scan control system according to claim 1 wherein said divide frequency circuit is controlled by TG/N to select JP2, JP4 of the jumpert setting for controlling the motor drive, or controlled by TG to select JP1,JP3 for controlling the motor drive.

* * * * *